United States Patent [19]
Brooks

[11] 3,848,707
[45] Nov. 19, 1974

[54] DISC BRAKE ADJUSTER
[75] Inventor: Frank W. Brooks, Dayton, Ohio
[73] Assignee: General Motors Corporation, Detroit, Mich.
[22] Filed: Aug. 13, 1973
[21] Appl. No.: 388,069

[52] U.S. Cl............................ 188/71.9, 188/196 BA
[51] Int. Cl............................................. F16d 65/56
[58] Field of Search...... 188/71.8, 71.9, 70 R, 70 B, 188/79.5 GE, 196 BA, 106 F

[56] References Cited
UNITED STATES PATENTS
2,888,102  5/1959  Eksergian et al. ................. 188/71.9
3,233,705  2/1966  Knapp ..................... 188/196 BA X

*Primary Examiner*—Duane A. Reger
*Attorney, Agent, or Firm*—D. D. McGraw

[57] ABSTRACT

A disc brake has a rotatable disc to be braked, a pair of opposed brake pad assemblies mounted in a brake caliper, and actuating mechanisms including a hydraulic piston and a ball and ramp actuator for parking brake actuation to move one of the brake pad assemblies into engagement with the disc, causing the disc to slide and engage the other brake pad assembly. The other brake pad assembly is fixed on the caliper by means of an adjusting screw, the nut of which may be indexed by an actuator lever pivotally mounted on the caliper between the brake pads so that arcuate movement of the inboard brake pad due to the ball and ramp actuation causes the actuator to pivot. With increased brake lining wear, greater arcuate movement of the inboard brake pad assembly occurs and the actuator is eventually moved sufficiently to index the adjusting screw nut and thereby move the outboard brake pad assembly toward the inboard brake pad assembly.

1 Claim, 3 Drawing Figures

DISC BRAKE ADJUSTER

The invention relates to a disc brake adjuster, and more particularly to one which utilizes limited arcuate or tangential movement of one brake pad assembly in one direction, caused by its engagement with the disc while the disc is rotating, to cause adjustment of the other brake pad assembly when there is sufficient movement to warrant such adjustment. The amount of movement is an indication of the amount of unadjusted brake lining wear. A ball and ramp energizing mechanism is used to reduce the amount of effort required to apply the brake and also to obtain the requisite tangential or arcuate movement of the one brake shoe assembly. When the brake is applied by forcing the inboard brake shoe against the rotating disc, the brake shoe tends to rotate with the rotor. This action causes balls or rollers to ride upwardly on the ramped surfaces provided as a part of the caliper and generates an additional force urging the brake lining against the rotor. Upon brake release, the brake shoe is returned to its original position.

In the brake illustrated, the outboard brake shoe assembly is adjusted inwardly as the brake lining wears. The disc also moves inwardly as the inboard lining wears. The outboard brake shoe assembly is positioned by an adjusting screw and nut located in the outer leg of the caliper. The outer periphery of the adjusting screw nut incorporates gear teeth. A pawl engages the teeth to cause incremental rotation of the adjusting screw nut. The pawl is a part of an actuator that pivots about a pin fixed to the caliper body. The inboard end of the actuator engages a notch in the inboard brake shoe. A torsion spring piloted by the pivot pin and located between the actuator and the caliper body returns the actuator to its initial position.

The notch in the inboard brake shoe is so located that the tangential movement of the brake shoe on a reverse brake application causes the actuator to rotate about the pivot pin. The actuator pawl engages a tooth on the adjusting screw nut, causing the nut to index. The outboard brake shoe assembly is therefore moved incrementally inward, which reduces the disc-to-lining clearance and in turn reduces the tangential travel permitted of the inboard brake shoe assembly. The next increment of adjustment occurs when the tangential movement of the inboard brake shoe assembly is again sufficient to move the actuator pawl the pitch distance of the gear teeth on the adjusting screw nut. The pawl, or actuating lever, is preferably a flexible member since it is possible that tangential movement of the inboard brake shoe can occur when the adjusting screw nut may not be able to rotate due to brake apply forces thereon acting on the outboard brake pad assembly. In installations where this is likely to occur often, the pawl may be located relative to the gear teeth of the adjusting screw nut so that the torsion spring moves the pawl to actuate the adjusting screw nut upon reverse brake release. In the drawing FIG. 1 is an elevation view, with parts broken away and in section, of a disc brake embodying the invention;

Figure 1:
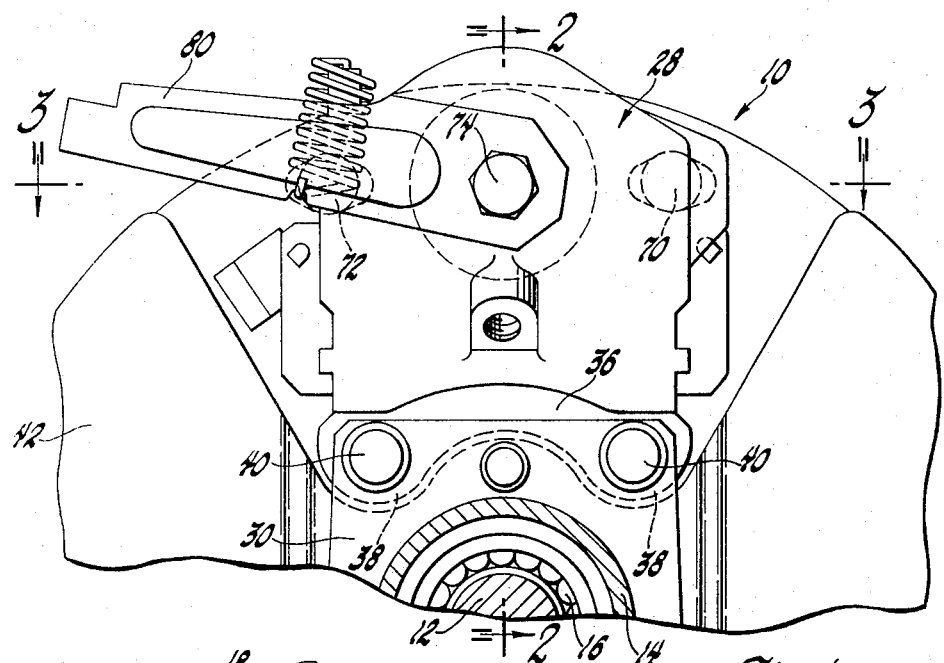

The disc brake assembly 10 is illustrated as being mounted for use with a rear wheel of a vehicle. The vehicle axle 12 is rotatably mounted in the axle housing 14 by bearing 16. The wheel 18 is secured to the hub 20 by the mounting bolts and nuts 22. Since the particular disc brake assembly shown is of the peripheral disc drive type, a disc drive and retainer 24 is also secured to hub 20 by means of the mounting bolts and nuts 22.

The disc 26 is mounted on the retainer 24 at its outer periphery by suitable lands or tongue-and-groove arrangements so that the disc may slide axially but is rotatably driven by the retainer 24. The disc brake assembly 10 also includes the fixed caliper 28. A caliper mounting flange 30 on axle housing 14 provides a suitable mounting for the caliper. The caliper includes an inboard leg 32 and an outboard leg 34 joined by a bridging section 36 which passes across disc 26 and internally of the disc. Lugs 38 extend inwardly from the bridging section 36 so that bolts and nuts 40 securely mount the caliper to the mounting flange 30. A disc shield 42 is also suitably mounted to the mounting flange 30.

The inboard leg 32 of caliper 28 is provided with a cylinder 44 in which the hydraulically actuated piston 46 is reciprocably mounted. Piston 46 is recessed at 48 to receive one end of a push rod 50. The inboard brake pad assembly 52 is positioned between disc 26 and piston 46. It is comprised of a brake shoe 54 and a lining 56. A recess 58 is provided on the back side of brake shoe 54 and receives the other end of push rod 50. A notch 60 is formed in the brake shoe 54 on its inner edge, this portion of the shoe extending inwardly below the inner edge of lining 56. As can be best seen in FIG. 3, the back of the brake shoe 54 is also provided with another pair of recesses 62 and 64 which are in linear alignment with push rod 50 when viewed in FIG. 1. The caliper leg 32 adjacent the open end of cylinder 44 has a pair of ramps 66 and 68 formed thereon opposite recesses 62 and 64. Energizing balls or rollers 70 and 72 are respectively received in the recesses and ramps which face each other. This construction provides the ball and ramp actuating mechanism for the brake and also provides a mount for the brake pad assembly 52 on the caliper leg 32 which permits limited brake pad assembly movement in the direction of rotation of the brake disc.

In order to provide for mechanical brake actuation for parking purposes, a screw or bolt 74 is threaded into the caliper housing so that it enters the hydraulic pressure chamber 76 and is engageable with the piston 46. A suitable seal 78 is provided to prevent fluid leakage. The lever 80 is secured to bolt 74 so that arcuate movement of the lever results in arcuate movement of the bolt and the bolt is then moved into or out of the chamber 76. Lever 80 is actuated by a pull cable for parking purposes. It can be seen that as the lever is rotated so as to thread bolt 74 into chamber 76, the inner end of the bolt will act on piston 46 to move the piston toward disc 26, thereby moving the inboard brake pad assembly 52 into braking engagement with disc 26.

The outboard brake pad assembly 82 includes brake shoe 84 and lining 86. An adjuster screw 88 is a threaded member secured to the back side of shoe 84 and extending away from disc 26. An adjuster nut 90 receives the adjuster screw 88 therethrough in threaded relation. The nut has a body section 92 and a flange section 94, the outer periphery of the flange section being formed with teeth 96. The body section is received in a bore extending through caliper leg 34 so that the adjuster nut is rotatable. The flange section 94 is positioned between the caliper leg 34 and the brake pad assembly 82, the gear teeth 96 of the flange section extending slightly below the inboard center portion of the brake shoe 84. A pivot pin 98 is secured to the caliper bridging section 36 intermediate the caliper legs 32 and 34. An actuator lever 100 is pivoted on pin 98 in a plane substantially parallel to the axis of rotation of the disc 26, which is the axis of axle 12. One end 102 of actuator lever 100 extends into notch 60 of brake shoe 54. The other end 104 of actuator lever 100 is formed to provide a pawl 106 which engages the gear teeth 96 of the adjuster nut 90. A torsion spring 108 is received about pivot pin 98 and has one end connected to the actuator lever 100 and the other end connected to the caliper bridging section 36. Spring 108 is torsionally loaded to urge the actuator lever 100 in one pivoting direction. When the brake mechanism is to be adjusted upon reverse apply, the arrangement is as shown in the drawing, and particularly in FIG. 3. In this arrangement, torsion spring 108 will urge the actuator lever 100 counterclockwise, as viewed in FIG. 3.

Figures 2, 3:
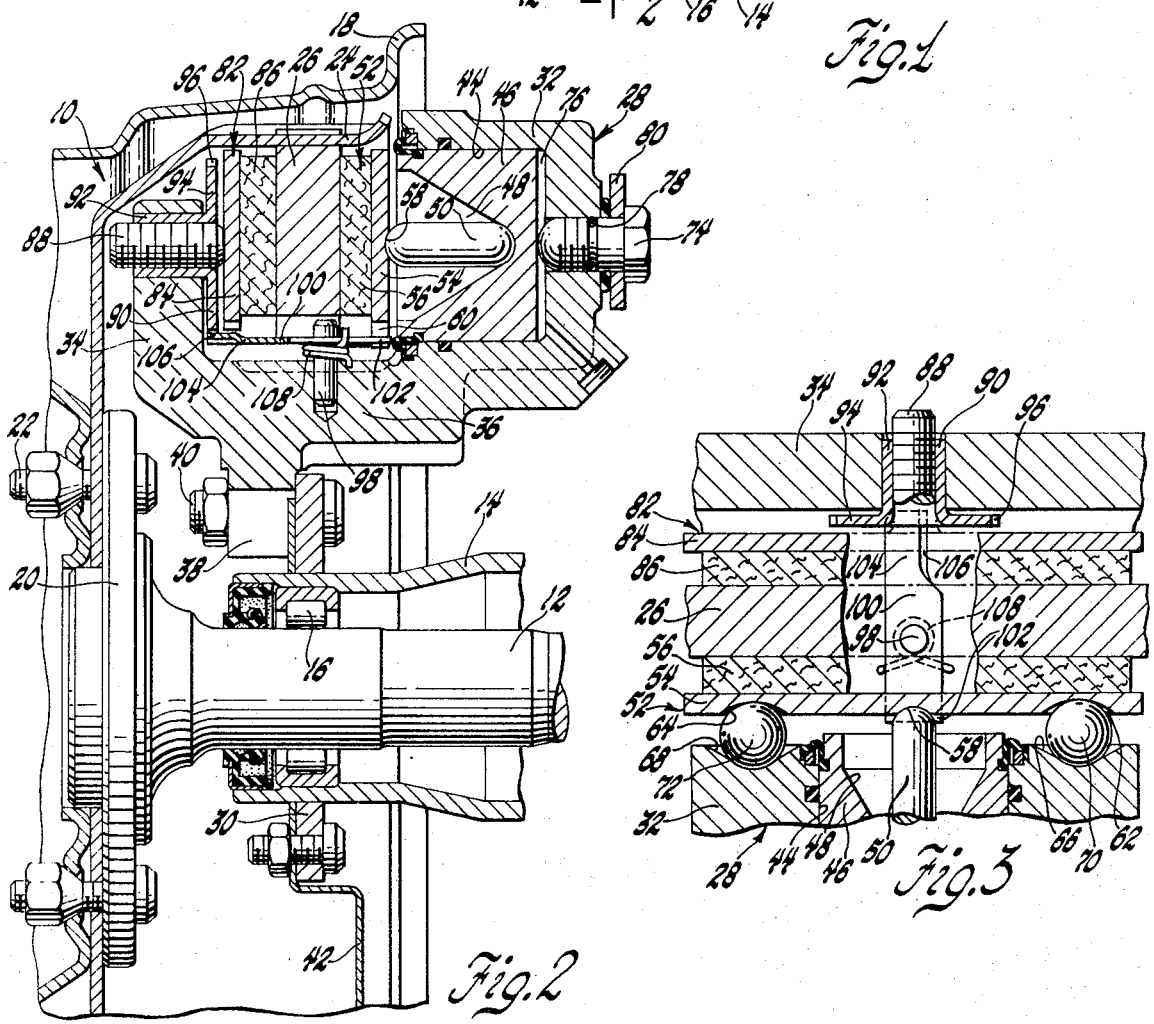
FIG. 2 is a cross-section view, with parts broken away, taken in the direction of arrows 2—2 of FIG. 1, of the disc brake embodying the invention.
FIG. 3 is a cross-section view, with parts broken away, taken in the direction of arrows 3—3 of FIG. 1 and illustrating in detail a portion of the mechanism embodying the invention.

When the vehicle in which the brake assembly is installed is traveling in the normal forward direction, the disc 26 is rotating in the forward direction indicated by arrow 110. When the brake is applied, either hydraulically or mechanically, piston 46 moves leftwardly, as seen in FIG. 2, and acts through push rod 50 to move the inboard brake pad assembly 52 into friction-braking engagement with one side of disc 26. This causes axial movement of the disc 26 relative to its retainer 24 so that the other side of the disc engages the lining 86 of the outboard brake pad assembly 82, thus having both brake pad assemblies in friction-braking engagement with the disc. When the lining 56 of the inboard brake pad assembly 52 engages disc 26, there is a tendency for the brake pad assembly to move to the right, as seen in FIG. 3, energizing the ball and ramp mechanism. Thus, balls 70 and 72 move up one side of ramps 66 and 68, causing additional movement of the brake pad assembly toward the disc 26. The amount of movement obtained is in direct relation to the amount of unadjusted brake lining wear reflected by the amount of clearance between the brake pad assembly friction linings relative to the thickness of the disc 26. Thus, the greater amount of unadjusted brake lining wear, the greater the amount of tangential movement obtained by the inboard brake pad assembly during this portion of its actuation. This movement will act on the end 102 of the actuator lever 100 to move the actuator counterclockwise. Since the actuator lever acts on the gear teeth 96 in a ratchet-like manner, the pawl 106 will tend to ratchet instead of drive the gear teeth. When sufficient movement occurs due to a larger amount of unadjusted brake lining wear, the pawl 106 will ratchet over one of the teeth of the gear teeth 96 and will therefore, be in position to make an adjustment when the brake is applied during reverse operation of the vehicle.

When the vehicle is moving in the reverse direction and the brake is applied, the disc 26 will be rotating in the opposite direction from that indicated by arrow 110. When the inboard brake pad assembly 52 has its lining in initial engagement with the disc 26, the inboard brake pad assembly will tend to move to the left, as seen in FIG. 3, to actuate the ball and ramp mechanism, as described above. This will also move the actuator lever 100 clockwise about its pivot pin 98 against the force of the torsion spring 108. Since the pawl 106 has positioned itself on one side of one of the teeth gear teeth 96, this movement will cause an incremental rotational movement of the adjuster nut 90 in a ratchet-driving manner, thereby causing the adjuster screw 88 to be screwed out of the nut and in the direction toward disc 26. This, therefore, moves the outboard brake pad assembly 82 closer toward disc 26, decreasing the amount of space between the brake shoe and the disc. This, therefore, provides for adjustment for lining wear by diminishing the clearance created due to lining wear. On the next forward braking operation, the inboard brake pad assembly 52 cannot move arcuately or tangentially as far as before, and the same is true upon and immediately following reverse brake operation. Only after the brake linings wear further can another adjustment occur in like manner to that described above.

The actuator lever 100 is preferably sufficiently flexible to permit movement of the lever even though the adjuster nut cannot be rotationally moved during the normal brake-adjusting operation. This can occur when the brake loads are sufficiently high to prevent movement of the adjuster nut 90. In some arrangements, it may be desirable to have the adjusting action occur upon reverse brake release. This can be accomplished by locating the pawl 106 on the other side of the actuating lever 100 and positioning the lever relative to the adjuster nut 90 so that action of the torsion spring 108 will move the adjuster nut in the proper rotational direction upon spring release after the inboard brake pad assembly has moved leftwardly, as seen in FIG. 3. Thus, the actuator lever 100 will cock the pawl 106 in preparation for adjustment, and the adjustment will actually occur when the lever is permitted to rotate counterclockwise under influence of the loaded torsion spring 108.

I claim:

1. A disc brake comprising:
   a rotatable disc to be braked, a caliper having first and second legs extending on each side of said disc, first and second friction brake pad assemblies respectively mounted on said first and second caliper legs to frictionally engage the opposed sides of said disc when the brake is actuated, and brake actuating means on said first leg when actuated moving said first friction brake pad assembly into engagement with said disc;
   said brake actuating means including a piston recessed to receive a push rod extending toward and engaging said first friction brake pad assembly for transmitting brake actuating force thereto in response to the application of brake actuating force on said piston;
   first piston means mounting said first friction brake pad assembly on said first leg for limited movement in the direction of rotation of said disc when said first friction pad assembly engages said disc while said disc is rotating, the amount of such movement being in accordance with the amount of unadjusted wear of said friction brake pad assemblies, said mounting means including first and second pairs of mating ramps respectively formed in said first leg and said first friction brake pad assembly and a ball received between each mating pair of ramps substantially in line with said piston push rod in the direction of limited movement of said first friction brake pad assembly in the direction of rotation of said disc;

second means mounting said second friction brake pad assembly on said second leg and including a first threaded member secured to said second friction brake pad assembly and extending away from said disc in axial alignment with said piston push rod and a second threaded member in threaded relation with said first threaded member and rotatably received in said second leg in axial alignment with said piston push rod and having a peripherally toothed flange extending beyond said second friction brake pad assembly and parallel to said disc;

and an adjuster pawl pivotally mounted on said caliper and extending across said disc and having one end engaging said first friction brake pad assembly in driven relation whereby said adjuster pawl is pivoted in a plane substantially parallel to the axis of said disc when said first friction brake pad assembly moves in the direction of rotation as aforesaid and has a spring urging the pawl in the opposite pivoted direction, the other end of said pawl acting on said teeth of said second threaded member in a ratchet-like manner in one pivotal direction to rotate said second threaded member upon a predetermined minimum amount of such first friction brake pad assembly movement to move said first threaded member and therefore said second friction brake shoe assembly toward said disc to adjust for wear of said friction brake pad assemblies.

* * * * *